United States Patent [19]

Khanzadian

[11] Patent Number: 4,930,388

[45] Date of Patent: Jun. 5, 1990

[54] KEYBOARD PROTECTOR

[76] Inventor: Sarkis Khanzadian, 112 Glen Dr., Aptos, Calif. 95062

[21] Appl. No.: 376,936

[22] Filed: Jul. 7, 1989

Related U.S. Application Data

[63] Continuation-in-part of Ser. No. 298,561, Jan. 17, 1989, abandoned.

[51] Int. Cl.[5] .............. G01C 3/02

[52] U.S. Cl. .............. 84/183

[58] Field of Search .............. 84/178–183, 84/DIG. 17

[56] References Cited

U.S. PATENT DOCUMENTS 594,012 11/1897 Hedgeland .............. 84/179

3,072,006 1/1963 Jurkowski .............. 84/183

4,040,335 8/1977 Oliver et al. .............. 84/183

4,419,921 12/1983 Simanski .............. 84/178 X

*Primary Examiner*—Brian W. Brown

*Attorney, Agent, or Firm*—Jeffrey A. Hall

[57] ABSTRACT

A removable unitary keyboard protector with attachment means adaptable to a broad spectrum of keyboard instruments. The protector includes a rear section with fastening means comprising fastening wedges adapted to conform to the space in between the black keys of the keyboard thereby attaching the keyboard protector thereto, a central cover position, and a frontal section fashioned to protect the keys and keyboard mechanism from contaminants or destructive forces to which such keyboard is accidentally or intentionally subjected.

16 Claims, 2 Drawing Sheets

KEYBOARD PROTECTOR

This is a continuation-in-part of Ser. No. 07/298,561, filed Jan. 17, 1989, now abandoned.

BACKGROUND

1. Field of Invention

This invention relates generally to removable keyboard protectors for keyboard instruments such as pianos, electronic pianos, organs, synthesizers, samplers, and the like, and especially to keyboard instruments that do not have built-in keyboard covers, for use in protecting the keys and operating mechanism from dust, dirt, dampness, and other contaminants and for performing a wide variety of other functions.

2. Description of Prior Art

Many, if not most users of keybaord instruments prefer a removable cover for their instruments in order to protect the keys and operating mechanism from dust, dirt, and other contaminants without elaborate and complicated application and removel procedures and mechanisms.

Heretofore a wide variety of keyboard protectors have been proposed and implemented for keyboard instruments.

One such device, U.S. Pat. No. 4,419,921 issued to Simanski teaches a shield for obstructing a players line of sight to a portion of the keyboard when the shield is attached. This provided an artificial aid to force the learner to rely upon the touch system in locating keys. Users, however, regarded this type of cover as unsatisfactory for protecting the keys from dust and dirt, and useful only in the limited application of shielding a players hands from his vision.

Another type of keyboard protector, U.S. Pat. No. 4,040,335 issued to Oliver et al, comprised a cover made from lightweignt rigid plastic, and contoured to fit the console walls embracing the keyboard of an electronic organ. This type of cover required the shape of the organ to be such as to accommodate the rigid plastic cover thereby limiting its applications, or alternatively, that the organ be retrofitted with additional parts so that the cover would fit properly. Users, however, found this type of cover to be cumbersome, complicated, difficult to apply and remove, and susceptible to scratches from dust, dirt, and other contaminants.

A different approach, U.S. Pat. No. 3,072,006 issued to Jurkowski teaches a keyboard cover for small organs or pianos comprising spring loaded parallel tubular rods with fabric attached thereto to cover the keys.

Users found this type if cover unsatisfactory due to the tendency of the spring mechanism to lose tension over time, and the cumbersome application and removal process associated with use of this cover. A further problem users found with this cover was that the rods to which the fabric was attached, being heavier than that of the fabric, caused the fabric to become taut when in a resting or applied position, which in turn caused tension to be constantly applied to the key tips. This feature is detrimental to the key spring tension mechanism of modern instruments which do not have built-in counter tension mechanical action levers to resist the downward force applied by the rods. As a result the keys are prone to losing their built-in tension and are susceptible to becoming partially depressed.

A still different approach, U.S. Pat. No. 594,012 issued to Hedgeland comprised a fallboard foldable upon itself and incorporated onto the keyboard instrument at the time of initial construction. This type of fallboard is unsatisfactory as a keyboard protector for modern instruments that do not have space inherent in their construction to accommodate the array of hinges, levers, and pivots employed in attaching the fallboard to the instrument. Furthermore, this type of fallboard was permanently attached to the instrument and was neither portable nor removable. Such fallboards were cumbersome, weighty, and required periodic maintenance including lubrication of moving parts. Additionally, this type of fallboard is not usable on modern keyboard instruments utilizing electronic means as their source of sound generation which consequently do not have space for sounding devices or action levers, thereby making such design obsolete and unsatisfactory for use as a keyboard protector.

Most users, therefore, would find it desirable to have a keyboard protector for their keyboard instrument which is easy to apply and remove, adaptable to a broad spectrum of instruments, and capable of protecting the keys and keyboard operating mechanism from a wide variety of contaminants without concomitant damage to the keyboard mechanism.

OBJECTS AND ADVANTAGES

Accordingly I claim the following as the objects and advantages of my invention: to provide a keyboard protector for keyboard instruments that is easily applied and removed, to provide a cover that can be made from flexible, lightweight material which conforms to the keys and protects both the keys and operating mechanism from dust, dirt, and other contaminants to provide such a cover that is easy to store and clean, and to provide such a cover which requires a minimum of skill and training to use.

In addition I claim the following additional objects and advantages to provide a cover for keyboard instruments which is attractive and unobtrusive, to provide such a cover with simple attachment means which does not require extensive modification of the keyboard prior to application, and to provide such a cover also suitable as an alternative choice of keyboard protector for the conventional piano.

Readers will find further objects and advantages of the invention from a consideration of the ensuing description and accompanying drawing.

DRAWING FIGURES

DESCRIPTION OF THE INVENTION

Figure 1:
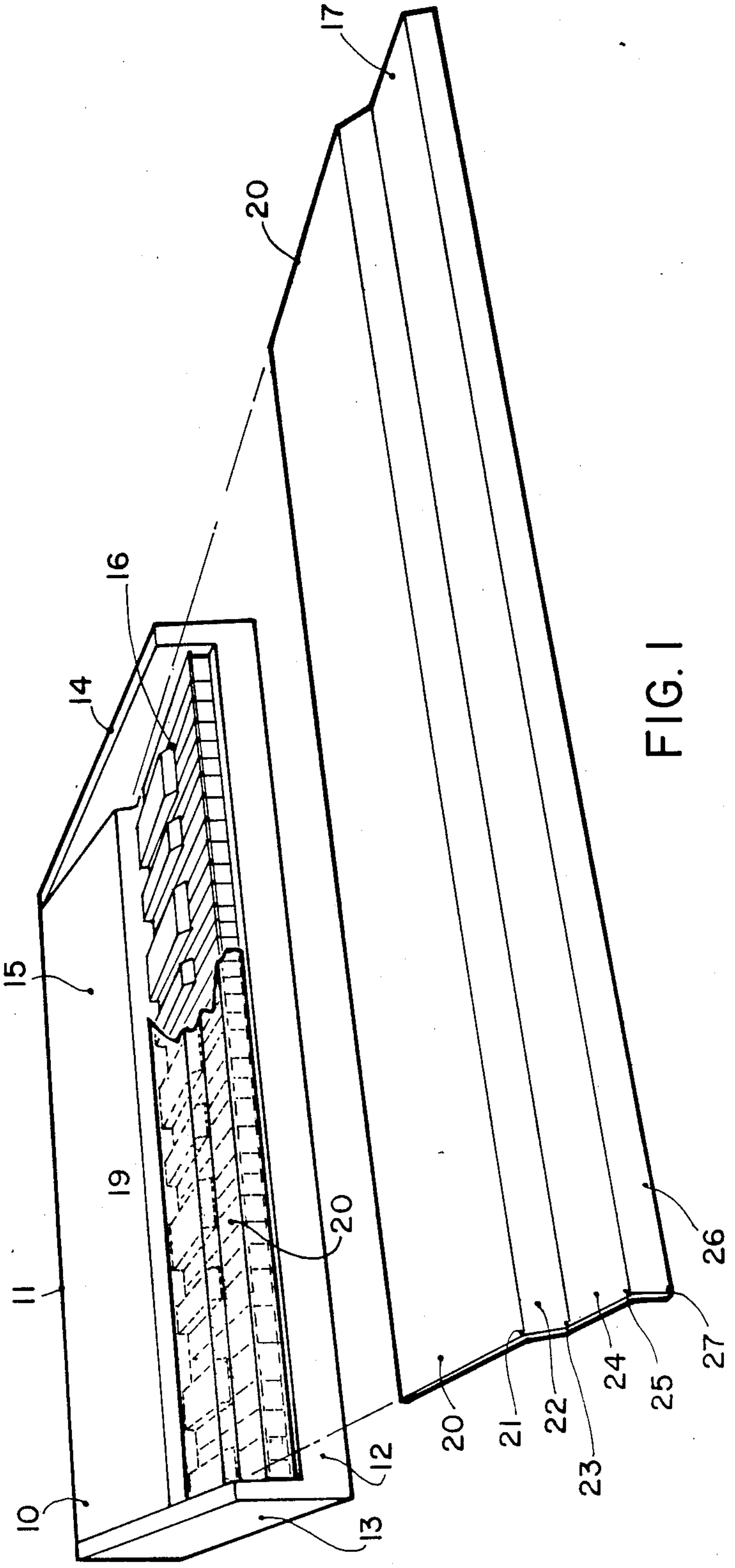
FIG. 1 shows an exploded isometric view of a keyboard cover according to the invention separated from the keyboard to which it is to be attached, but oriented in a position for easy placement thereto.
Figure 2:
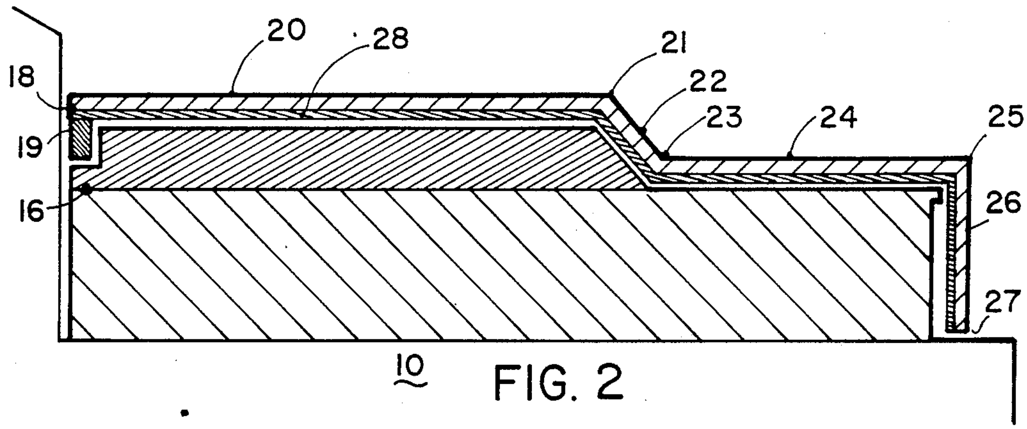
FIG. 2 shows a sectional view of a keyboard instrument having such cover attached, illustrating the cover in use and depicting one manner of attachment, a portion of the keyboard in plan view.
Figure 3:
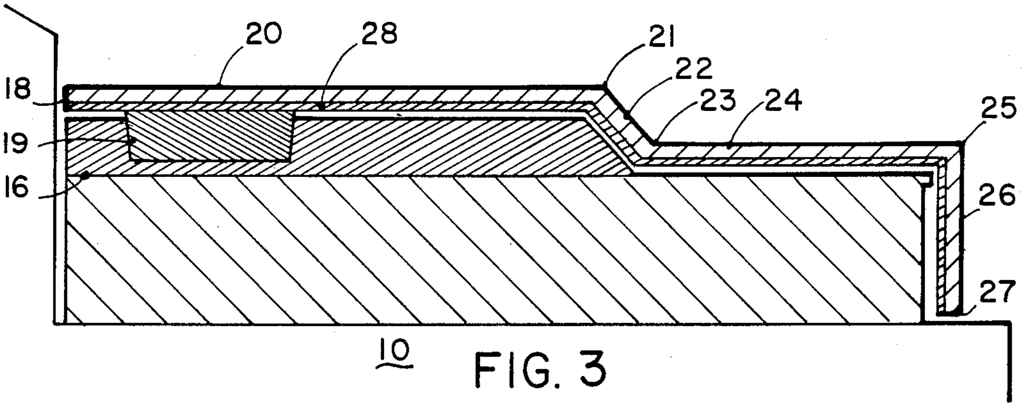
FIG. 3 shows a sectional view of such cover depicting another manner of attachment, a portion of the keyboard in plan view.
Figure 4:
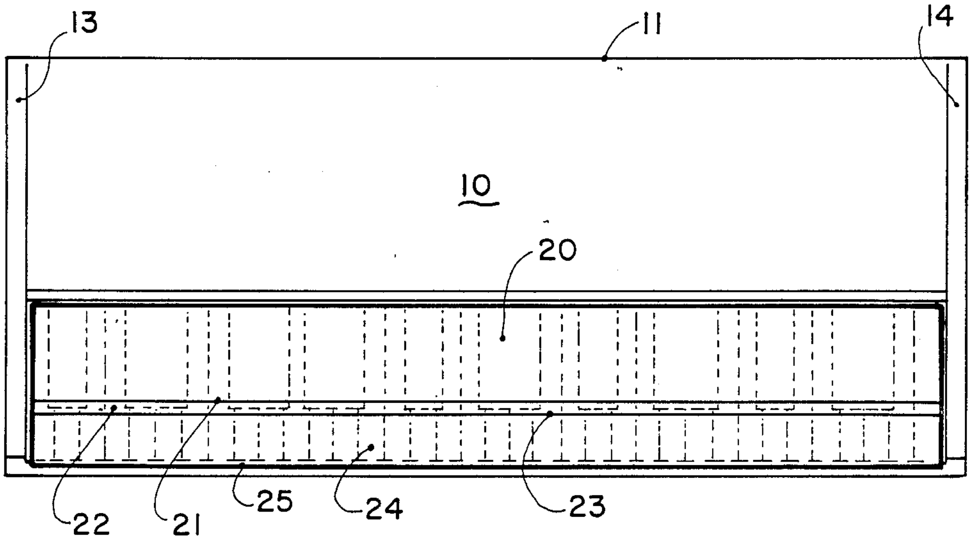
FIG. 4 shows a topographical view of a keyboard instrument having such cover attached, illustrating the cover in use.
Figure 5:
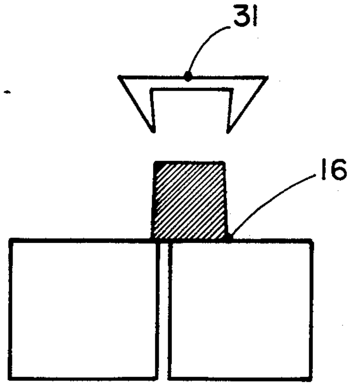
FIG. 5 shows an exploded view of a fastening track keeper over black key of keyboard and in position to be attached thereto.
Figure 6:
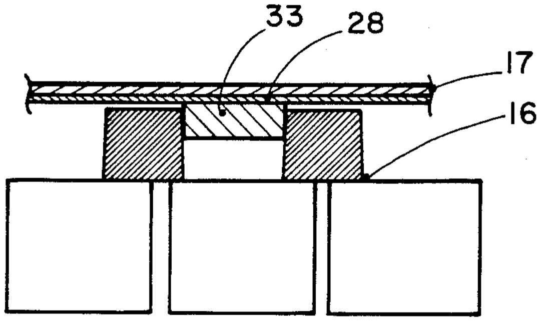
FIG. 6 shows an exploded view of a fastening wedge in position securing keyboard protector to the keyboard according to the preferred embodiment.

FIG. 1 shows a keyboard protector 17 according to the preferred embodiment of the invention and a keyboard instrument designated 10 with cabinets 11 having a front 12 and sidewalls 13 and 14 as well as an offset top 15 confining a keyboard 16. The keyboard protector 17 of this invention is formed from a flexible lightweight material such as felt or other fabric, but may also be composed of plastic, urethane, or other lightweight, flexible material. The protector 17 includes an upwardly and rearwardly inclined rear section 20 to which an interfacing layer of protective material 28, as shown in FIG. 2, permanently bonded to keyboard protector 27. The protective material 28 may be cloth, plastic, urethane, or the like, either fusable or nonfusable, woven or nonwoven, and functions to prevent the passage of dirt, dust, or other contaminants. In the preferred embodiment fastening means are provided by a plurality of fastening wedges 33 that conform to the space in between the black keys of the keyboard as illustrated in FIG. 6. The keyboard protector rests on the black keys 16 of the keyboard 10 while the fastening wedges secure the keyboard protector thereto by frictional tension or pressure to the black keys. This allows for uniform placement of the protector with fastening wedges 33 adapted to conform to the space between the black keys, thereby attaching the protector at the surface level of the black keys. The fastening wedges 33 may be made of urethane, plastic, acetate, or the like. The fastening wedges 33 are attached to the keyboard protector 10 by two sided adhesive tape 29 or alternatively may be glued or otherwise secured onto the keyboard protector. In another embodiment closed cell fastening track keepers 31 as shown in FIG. 3 and FIG. 5 may be used as fastening means. The closed cell fastening track keeper in this embodiment of the invention is attached to the keyboard protector by two sided adhesive tape 29 or alternatively may be glued or otherwise secured onto the keyboard protector. The fastening track keeper 31 is adapted to conform to, and fit over the upraised black keys 16 of the keyboard. The track shape of the fastening track keeper 31 is shown in FIG. 5. The track or groove shape of the fastening track keeper 31 secures the keyboard protector to the keys by friction and drag and is easily attached or removed. An alternative configuration of the fastening track keeper is shown in FIG. 2. In this embodiment the fastening track keeper 30 is L-shaped and is adapted to conform to the top rear portion of the black keys 16 and the space immediately behind them as shown in FIG. 2. In still another embodiment various fastening type means such as opposing hook and loop fastening tape may be used to secure the keyboard protector to the keyboard instrument. Intermediate section 22 is joined to rear section 20 by a rear laterally extending edge 21. A substantially horizontal, planar central section 24 forms a continuous extension of intermediate section 22 through intermediate laterally extending edge 23 to the rear, and forms a continuous extension with a downwardly and forwardly inclined frontal section 26 through a laterally extending edge 25 terminating in frontal laterally extending edge 27. The keyboard protector 17 can be easily fabricated by cutting a substantially planar sheet of felt or other suitable material, molding it into the desired shape, and attaching said loop or hook fasteners thereto.

Keyboard Protector—Operation

The keyboard protector of this invention may be applied to all varieties of keyboard instruments including pianos, organs, synthesizers and the like. Referring specifically to FIG. 1 the keyboard protector 17 is shown in its desired orientation for placement on the keyboard 10. Specifically, the rear section 20 is positioned so that it rests on cabinet 11. Thereafter the protector is rotated gently to cause the planar central section 24 to rest on keyboard 16 and frontal section 26 to occupy the position shown in FIG. 2 and FIG. 3. In the preferred embodiment of this invention said fastening wedges 33 secure the protector in place by attachment to the black keys of the keyboard as shown in FIG. 6.

The keyboard protector 17 can be easily removed from the keyboard by simply raising it away from the keyboard thereby detaching the fastening wedges 33 from the keyboard keys 16.

Users will find the protector of FIG. 1 to 6 advantageous since it can be adpated for use with any type of keyboard instrument, and can be easily applied and removed with minimal effort.

While the above description contains many specificities, the reader should not construe these as limitations on the scope of the invention but merely as exemplifications of preferred embodiments thereof. Those skilled in the art will envision many other possible variations are within its scope. For example skilled artisans will readily be able to change the dimensions and shapes of the various embodiments. They will be able to make the protector of alternative materials such as cloth, plastic or molded urethane. They can make variations in the placement, sizes, and materials which comprise the fasteners and can substitute alternative attachment means such as fastening tape. It is understood that the present disclosure has been made by way of example and that numerous changes can be made withourt departing from the spirit and scope of the invention. Accordingly the reader is requested to determine the scope of the invention by the appended claims and their legal equivalents, and not by the examples which have been given.

I claim:

1. The combination of a detachable keyboard protector and a keyboard instrument of the type having a plurality of keys arranged horizontally and a plurality of black or upraised keys, comprising:
   - a rear section with a plurality of fastening means attached thereto, an intermediate section unitarily joined to the rear section at a rear laterally extending edge,
   - a horizontal planar central section joined to the intermediate section at an intermediate laterally extending edge,
   - a frontal section joined to the planar central section through a forward laterally extending edge and terminating in a frontal laterally extending edge, and
   - an interfacing layer of protective material permanently bonded to said keyboard protector, thereby preventing passage of dirt, dust, and other contaminants.

2. The keyboard protector of claim 1 wherein said fastening means comprise a plurality of fastening wedges attached to said rear section of the keyboard protector and adapted to conform to a space between said black or upraised keys.

3. The keyboard protector of claim 1 wherein said fastening means comprise a plurality of fastening track keepers adapted to conform to and fit over said black or upraised keys of the keyboard instrument.

4. The keyboard protector of claim 1 wherein said fastening means comprise a plurality of L-shaped fastening track keepers adapted to conform to a top rear portion of said black keys and to a space immediately behind them.

5. The keyboard protector of claim 1 wherein said keyboard protector is composed of felt.

6. The keyboard protector of claim 1 wherein said keyboard protector is composed of plastic.

7. The keyboard protector of claim 1 wherein said keyboard protector is composed of plastic.

8. The keyboard protector of claim 1 wherein said keyboard protector is composed of cloth.

9. A removable keyboard protector adapted to be attached to a keyboard instrument of the type having a plurality of keys arranged horizontally and a plurality of black or upraised keys comprising:

a rear section with a plurality of fastening means attached thereto, an intermediate section unitarily joined to the rear section at a rear laterally extending edge, a horizontal planar central section joined to the intermediate section at an intermediate laterally extending edge, a frontal section joined to the planar central section through a forward laterally extending edge and terminating in a frontal laterally extending edge, and an interfacing layer of protective material permanently bonded to said keyboard protector, thereby preventing passage of dirt, dust, and other contaminants.

10. The keyboard protector of claim 9 wherein said fastening means comprise a plurality of fastening wedges attached to said rear section of the keyboard protector and adapted to conform to a space between said black or upraised keys.

11. The keyboard protector of claim 9 wherein said fastening means comprise a plurality of fastening track keepers adapted to conform to and fit over said black or upraised keys of the keyboard instrument.

12. The keyboard protector of claim 9 wherein said fastening means comprise a plurality of L-shaped fastening track keepers adapted to conform to a top rear portion of said black keys and to a space immediately behind them.

13. The keyboard protector of claim 9 wherein said keyboard protector is composed of felt.

14. The keyboard protector of claim 9 wherein said keyboard protector is composed of plastic.

15. The keyboard protector of claim 9 wherein said keyboard protector is composed of urethane.

16. The keyboard protector of claim 9 wherein said keyboard protector is composed of cloth.

* * * * *